United States Patent [19]

Dhein et al.

[11] 3,928,265

[45] Dec. 23, 1975

[54] LACQUER SYSTEMS WHICH ARE HARMLESS TO THE ENVIRONMENT

[75] Inventors: Rolf Dhein; Bernd-Ulrich Kaiser; Hans Rudolph; Rolf Küchenmeister; Clemens Niehaus, all of Krefeld, Germany

[73] Assignee: Bayer Aktiengesellschaft, Leverkusen-Bayerwerk, Germany

[22] Filed: Aug. 7, 1974

[21] Appl. No.: 495,407

Related U.S. Application Data

[63] Continuation of Ser. No. 410,687, Oct. 29, 1973.

[52] U.S. Cl. .............. 260/21; 260/22 R; 260/31.6; 260/33.4 R; 260/850
[51] Int. Cl.² .................................. C08L 91/00
[58] Field of Search ......... 260/21, 33.4 R, 850, 31.6

[56] References Cited

UNITED STATES PATENTS

| | | | |
|---|---|---|---|
| 2,816,874 | 12/1957 | Schmutzler | 260/21 |
| 3,451,955 | 6/1969 | Koral et al. | 260/21 |
| 3,532,768 | 10/1970 | Dalibor et al. | 260/850 X |

*Primary Examiner*—Lewis T. Jacobs
*Attorney, Agent, or Firm*—Connolly and Hutz

[57] ABSTRACT

Object of the invention are stoving lacquer systeme which are harmless to the environment and which are based on mixtures of high-molecular weight polyesters containing hydroxyl groups and optionally carboxyl groups, monomolecular polyfunctional hydroxyl compounds and melamine resins. These lacquer systeme will be applied solvent-free or at least with a low solvent content.

4 Claims, No Drawings

LACQUER SYSTEMS WHICH ARE HARMLESS TO THE ENVIRONMENT

CROSS-REFERENCE TO RELATED APPLICATION

This application is a continuation of application Ser. No. 410,687 filed Oct. 29, 1973 and now abandoned.

This invention relates to stoving lacquer systems which are harmless to the environment and which are based on mixtures of high-molecular weight polyfunctional hydroxyl compounds and monomolecular polyfunctional hydroxyl compounds with melamine resins.

Stoving lacquer systems which are solvent-free or have only a low solvent content are already known. Alkyd resins, among others, have been converted into liquid lacquer raw materials by a precondensation process carried out in the heat with unetherified and, therefore, incompatible methylol melamines. This method has the serious disadvantage that the methylol melamines are incompatible with the alkyd resins before they are united. Heat treatment is necessary to render them compatible. The consequence of this is that the lacquers do not harden at temperatures below about 180°C (German Offenlegungsschrift Nos. 2,036,289; 2,036,714 and 2,055,107).

Attempts were already made at an eary stage of the development of these systems to develop solvent-free coatings based on aminoplasts. Thus, in German Auslegeschrift No. 1,101,667, there are described solvent-free stoving lacquers based on aminoplasts which are obtained by cross-linking aminoplast solutions with conventional plasticizers and then distilling off the solvent.

Plasticizers which contain hydroxyl groups, e.g. castor oil, are mentioned as particularly suitable plasticizers. The coatings obtained from such coating materials by stoving have only a low solvent resistance and low chemical resistance, do not adhere firmly to metals and have unsatisfactory mechanical properties (German Offenlegungsschrift No. 2,019,282, page 2, last paragraph; page 3, paragraph 1).

It has now surprisingly been found that particularly valuable solvent-free or low-solvent stoving lacquer systems can be produced if high molecular weight polyesters with molecular weights between 1500 and 5000 which contain hydroxyl groups and which may also contain carboxyl groups and which may be modified with saturated or unsaturated monocarboxylic acids, and monomolecular hydroxyl compounds which have molecular weights between 62 and 1000 and are at least divalent are used as binders and melamine resins are used as cross-linking agents.

After the numerous attempts to develop solvent-free or low-solvent lacquer systems, which can lead to the production of powder lacquers which are very difficult to use and difficult to obtain in the required colour shades and have to be applied by electrostatic processes which frequently result in defective lacquer coats due to insufficient action of the charge (DL-PS 55820), it was particularly surprising to find that lacquer systems which are liquid but equally harmless to the environment could be obtained by a process which is so simple to carry out. The solution of this environmental problem of the lacquer raw material industry by means of the combination according to the invention was all the more surprising since it not only resulted in lacquer raw materials which are harmless to the environment but, in addition, this new binder combination also has very good film-forming properties combined with low hardening temperatures, gives rise to highly elastic, nail-hard and stable stoving lacquers and flows extremely smoothly.

It is also known to dissolve lacquer raw materials such as melamine resins in alcohols such as butanol but these solutions have, in the past, only been used in combination with solutions of alkyd resins, usually in aromatic solvents, so that considerable air pollution problems arose.

The combination according to the invention reduces or substantially obviates this disadvantage in that high solid lacquer raw materials which are free from aromatic solvents and in which the function previously carried out by the solvents is taken over by low-molecular weight or preferably monomolecular polyhydroxyl compounds which are not volatile but which, together with the alkyd resins and melamine resins, form part of the film-forming substance during the stoving process are for the first time made available for use in the field of so-called high-solid lacquers which may be applied by hot spraying.

This new process has the commercially important advantage that the alkyd resins which have long been known for their valuable properties can be used practically unchanged. That other positive film-forming properties could in addition be obtained by a suitable combination of the low-molecular weight of monomolecular hydroxyl compounds was a particularly surprising additional benefit. Thus, with a suitably chosen combination, a given hard alkyd resin may be used to produce both hard and elastic lacquer coats by the selective addition of specifically elasticising or inert hydroxyl compounds. The high-molecular weight alkyd resins which are much sought after for many purposes and especially for coil coating but which frequently tend to form uneven film surfaces have a much better flow when used in the combination according to the invention.

A special advantage is obtained if the combination according to the invention is applied to binder systems for high solid lacquers which are based on low-molecular weight alkyd resins with molecular weights near the lower limit of 1500. Such combinations may be used completely free of solvents.

Suitable alkyd resins include those oil-free polyesters and/or polyesters modified with saturated and/or unsaturated fatty acids which are commonly used for coatings which are heat - hardened with melamine resins. In the case of those polyesters which are modified with fatty acids, the fatty acid content should preferably be in the region of from 18 to 50 %. Particularly preferred fatty acid contents within these limits are between 18 and 22 %, between 24 and 28 % and between 30 and 40 %.

The following is a list of examples of typical constituents of alkyd resins, but the list is not complete: Ethylene glycol, propylene glycol, butanediols, hexanediols, glycerol, trimethylolpropane, pentaerythritol, sorbitol, perhydrobisphenol, bis-hydroxyethyl-bisphenol, phthalic acid anhydride, isophthalic acid, tetrachlorophthalic acid, tetrahydrophthalic acid anhydride, hexahydrophthalic acid, adipic acid, maleic acid anhydride, benzoic acid, butyl benzoic acid, hexahydrobenzoic acid, α-ethyl-hexanoic acid, fatty acid of coconut oil, fatty acid of peanut oil, fatty acid of soya oil, cotton seed fatty acid, safflower fatty acids, castor oil, dehydrated castor oil, conjugated or isomerised unsaturated fatty acids. The alkyd resins have acid numbers of between 5 and 40, preferably between 15 and 30, and hydroxyl numbers of between 40 and 140, preferably between 60 and 100.

Polyalcohols, and preferably liquid polyalcohols such as ethylene glycol, propylene glycol, diethylene glycol and glycerol are examples of suitable monomolecular polyhydroxyl compounds, but bis-glycol adipate and castor oil are also suitable.

Castor oil is particularly advantageous because it is both elasticising and improves the flow.

The desired viscosity for application and particular coating properties can be obtained by using a suitable and, in many cases, preferred combination of two low-molecular weight or monomolecular polyhydroxyl compounds. Combinations which are particularly preferred for this purpose are mixtures of glycerol with castor oil and/or with ethylene glycol and mixtures of propylene glycol with castor oil.

The proportions in which the alkyd resins are mixed with the monomolecular polyhydroxyl compounds are determined both by the desired properties of the coating and by the viscosity required for application. The range of proportions which is particularly preferred for the high solid alkyd resin/melamine resin/polyalcohol mixtures according to the invention which may be applied hot if desired lies within 5 to 20 % by weight of low molecular weight or monomolecular polyhydroxyl compounds and 80 to 95 % by weight of alkyd resin, these proportions referring to the amounts present in the binder alone. Based on this mixture, the proportion of melamine resin is preferably 20 to 30 parts by weight for every 100 parts by weight of the mixture according to the invention. Other conventional lacquer solvents may be used in addition, e.g. esters and monoalcohols. The following lacquer constituents may also be present: Pigments, fillers, catalysts, inhibitors as well as additional binder components, e.g. phenol resins. The phenol resins may also be reacted with the unsaturated fatty acids.

Melamine resins in the context of this invention are reaction products of melamine and formaldehyde which are partly or completely etherified with monoalcohols and which are liquid products which may still contain monoalcohols as solvents, which can be mixed with alkyd resins to form clear mixtures. Benzoguanamine resins and urea may also be used, but the melamine resins are preferred.

Among the many possible combinations, the following combinations are particularly preferred for use in high solid lacquers which may also be applied hot if desired, because these combinations give rise to particularly stable lacquers and exceptionally valuable lacquer coats: Alkyd resins which have been prepared by the simultaneous dehydration, ester interchange and esterification of castor oil, trimethylolpropane and/or pentaerythritol, phthalic acid anhydride and/or adipic acid, which may be followed by reaction with trimethylolpropane and phthalic acid; and, as monomolecular compound, a mixture of castor oil and propylene glycol or propylene glycol alone, if desired with the addition of glycerol.

The parts given in the following examples are parts by weight.

EXAMPLE 1

An alkyd resin is prepared from 1565 parts of castor oil, 1363 parts of trimethylolpropane, 322 parts of benzoic acid and 1544 parts of phthalic acid anhydride by dehydration, ester interchange and esterification at temperatures above 200°C under nitrogen. In a following reaction stage, this alkyd resin is then reacted with phthalic acid anhydride to yield an alkyd resin which has a castor oil content of about 31 %, an acid number of about 20 and a viscosity of 19600 cP determined on an 80 % solution in n-butanol (DIN 53211).

A clear lacquer is produced from 100 parts of an 80 % solution of the alkyd resin in n-butanol, 6.4 parts of propylene-1,2-glycol and 24 parts of a 72 % solution of a melamine resin in butanol. When applied to metal in the heat, this lacquer gives rise to a nail-hard, non-yellowing, elastic and well-levelled lacquer coat after a hardening time of 30 minutes at 120°C.

EXAMPLE 2

An alkyd resin which has been prepared from castor oil, trimethylolpropane, phthalic acid anhydride and benzoic acid by dehydration, esterification and ester interchange at 260°C followed by reaction with trimethylolpropane and phthalic acid anhydride and which has a castor oil content of about 32 %, a phthalic acid anhydride content of 40 %, an acid number of about 18 to 30 and a viscosity of 80 to 100 sec (50 % in xylene, DIN 53211) is dissolved in n-butanol to form an 80 % solution.

A clear lacquer with a viscosity of 13800 cP is obtained from 100 parts of this 80 % solution, 6.4 parts of propylene-1,2-glycol and 24 parts of 72 % melamine resin solution in butanol. When this lacquer is applied to metal, it hardens within 30 minutes at 120°C without the aid of catalyst to form a nail-hard and very elastic lacquer coat.

We claim:

1. A composition comprising (A) a melamine formaldehyde condensation resin, (B) an alkyd resin having a molecular weight between 1500 and 5000, an acid number between 5 and 40 and a hydroxyl number between 40 and 140 and (C) a hydroxyl compound selected from the group consisting of ethylene glycol, propylene glycol, diethylene glycol, glycerol, bis-glycol adipate and castor oil, component (B) being present in an amount of 80 to 95% by weight, based on the combined weight of (B) and (C), component (C) being present in an amount of 5 to 20%, based on the combined weight of (B) and (C), and component (A) being present in an amount of 20 to 30 parts by weight for every 100 parts by weight of said composition.

2. The composition of claim 1 wherein said alkyd resin is modified with a fatty acid.

3. The composition of claim 1 wherein component (B) is an alkyd resin having an oil content between 18 and 50% by weight, an acid number between 15 and 30 and a hydroxyl number between 60 and 100.

4. The composition of claim 1 wherein component (C) is castor oil, propylene glycol or a mixture thereof.

* * * * *